United States Patent [19]
Boretos

[11] 3,911,502
[45] Oct. 14, 1975

[54] COMPOSITE HEART VALVE POPPET

[75] Inventor: John W. Boretos, Rockville, Md.

[73] Assignee: The United States of America as represented by the Secretary of the Department of Health, Education, and Welfare, Washington, D.C.

[22] Filed: Aug. 23, 1974

[21] Appl. No.: 500,056

[52] U.S. Cl. .............................. 3/1.5; 137/533.11
[51] Int. Cl.² .......................................... A61F 1/22
[58] Field of Search ....... 3/1.5; 137/533.11, 533.13, 137/533.15

[56] References Cited
UNITED STATES PATENTS
3,579,645  5/1971  Bokros .................................. 3/1.5

OTHER PUBLICATIONS
"Experiences with new types of Aortic Valvular Prostheses" by Charles A. Hufnagel et al., Annals of Surgery, Vol. 147, No. 5, May 1958, pages 636–644.
"Segmented Polyurethane: A Polyether Polymer, II. Two Years Experience" by V. W. Boretos et al., Journal of Biomedical Materials Research, Vol. 5, No. 1, Jan. 1971, pp. 373–387, 3–1.

Primary Examiner—Ronald L. Frinks

[57] ABSTRACT

A composite heart valve poppet for use in ball-in-cage type artificial heart valves is disclosed. The poppet includes a core of a rigid material such as polypropylene, covered by a jacket of an elastomer such as segmented polyether polyurethane. The heart valve poppet of the present invention provides improved operating performance, physiological acceptability, length of service and reliability compared to previously known poppets.

1 Claim, 1 Drawing Figure

U.S. Patent  Oct. 14, 1975  3,911,502
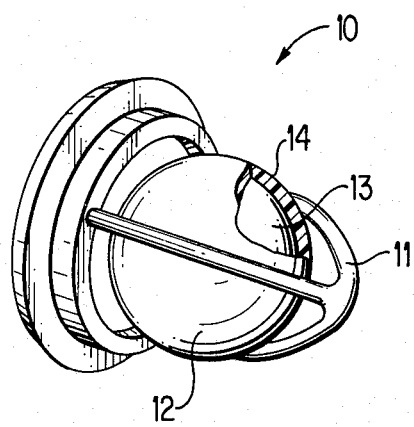

COMPOSITE HEART VALVE POPPET

BACKGROUND AND SUMMARY OF THE INVENTION

The present invention relates to a poppet for use in artificial heart valves. More particularly, the present invention relates to a poppet having a solid center covered by a jacket of an elastomeric material, the poppet being particularly well suited for use in ball-in-cage type artificial heart valves.

In artificial heart valves of the ball-in-cage type, the poppet or ball portion has heretofore generally been constructed either in the form of a pyrolytic carbon ball, a hollow titanium or cobalt-chromium alloy sphere or a solid silicone rubber ball. These constructions are described, for example, in U.S. Pat. No. 3,691,567 to Cromie and U.S. Pat. No. 3,509,582 to Pierie et al. Such prior art constructions have been found to have numerous deficiencies. For example, silicone rubber balls are subject to lipid absorption from the blood stream, with concomitant changes in dimensions and physical integrity, so that splitting, tearing, and clotting result. Also, silicone balls possess a low order of wear resistance. Disadvantages of titanium or cobalt-chromium alloy spheres and pyrolytic carbon poppets include the fact that poppets formed of these materials are abrasive to cloth covered struts, causing fragmentation of the cloth with ensuing emboli. Cloth coverings have been shown to minimize thrombus formation on valve structures and are generally considered necessary. Paravalvular leaks caused by cloth wear on the valve seats is responsible for high blood hemolysis. These prior art poppets are also abrasive to bare metal valve surfaces, especially where metal-to-metal contact is involved. In addition, such poppets are quite hard and generate a clicking sound with each cycle. This noise and its associated anticipation is highly distressing to some patients. Finally, these prior art poppets can have specific gravity values greater than that of blood (1.05–1.075), thereby producing a sluggishly responding poppet and/or a partially stenotic valve.

With regard to poppets formed of pyrolytic carbon, such poppets are not inert to heparinization. Heparinization produces surface roughness which decreases its antithrombogenic properties, thereby diminishing the benefits of the valve. Although these poppets have shown a low order of thrombogenicity without heparinization, many surgeons feel that heparinization is necessary to guarantee uneventful recovery in the postoperative period. These prior art poppets also possess physical properties which may result in future valve poppet failure. To achieve the hardness and wear resistance of pyrolytic carbon, ductility is lost and brittleness increased during the manufacturing process. Stress applied to the carbon during such treatment can result in cracks. In addition, such poppets cannot be sterilized by conventional steam autoclaving and less desirable sterilization means must therefore be employed. Autoclaving has been shown to reduce markedly its thromboresistance, probably due to the formation of oxygen-bearing functional groups as hydrophilic sites on the surface.

By the present invention, there is provided a composite heart valve poppet for use in artificial heart valves of the ball-in-cage type. The heart valve poppet of the present invention has been found to overcome the disadvantages of prior art poppets as previously discussed. The present heart valve poppet is formed as a ball having a solid center or core, covered by a jacket of an elastomeric material. Such a composition provides improved operating performance, physiological acceptability, length of service and reliability over previously known poppets.

BRIEF DESCRIPTION OF THE DRAWING

The advantages and features of the artificial heart valve poppet of the present invention will be more clearly understood from the following description of the preferred embodiments, taken in conjunction with the accompanying drawing, wherein:

The sole FIGURE of the drawing shows a perspective view of an artificial heart valve of the ball-in-cage type, containing the heart valve poppet of the present invention.

DESCRIPTION OF THE PREFERRED EMBODIMENTS

In the embodiment of the present invention as illustrated in the sole FIGURE of the drawing, there is shown a heart valve 10 having a cage structure 11 within which is held a poppet in the form of a ball 12. The ball 12 has an inner core 13 and outer jacket or cover 14 as shown in the broken away portion of the ball 12.

The core 13 of the improved poppet of the present invention is formed of a rigid, physiologically inert solid material. Examples of materials which may be employed include polymeric materials such as polyethylene, polypropylene, polycarbonate and foamed polytetrafluoroethylene. The core may also be formed of carbon or ceramic material or as a hollow steel sphere.

The jacket or cover 14 for the core 13 is formed of a physiologically inert elastomeric material such as segmented polyether polyurethane. A particular segmented polyether polyurethane which has been employed is that manufactured by Ethicon Corporation, Somerville, N.J., under the trademark Biomer. Other elastomeric materials which may be employed for the cover of the poppet include medical grades of silicone rubber or natural rubber, and also block copolymers such as styrene-butadiene-styrene.

The outer jacket or cover 14 can be constructed over the core 13 using conventional molding methods. For elastomers in solvent systems, for example, the cover may be applied by the multiple layer technique described by Boretos, J.W. et al., "Segmented Polyurethane: A Polyether Polymer, II. Two Years Experience," J. Biomed. Mater. Res., 5: 373 (1971). The cover should be applied so as to have a final thickness of from 0.5 to 3.0 mm. Such a thickness has been found to provide the proper combination of features of the cover and core, as described hereinafter.

In selecting the materials for the core and jacket of the poppet, it is important to bear in mind that the poppet should be constructed so that it will have a specific gravity which is not greater than that of blood. By so doing, there will be produced a highly responsive valving action. Since blood may have a specific gravity as great as about 1.075, this figure then represents the maximum specific gravity for the poppet as constructed according to the present invention. In this regard, it is noted that the specific gravity of the previously mentioned cover materials is generally somewhat greater than 1.0, so that, by selecting a core material which has a specific gravity of less than 1.0, the final composite poppet will comply with the required limitation with regard to specific gravity.

A typical construction for a 22.30 mm O.D. poppet includes a 20.02 mm O.D. core of polypropylene (specific gravity, 0.9) covered by a 1.14 mm coating of a segmented polyether polyurethane (specific gravity 1.1). The resultant overall specific gravity is less than 1.0.

The composite heart valve poppet of the present invention is thus provided with an outer jacket which is less destructive to cloth valve coverings than either metal or carbon poppets. The present poppet offers a quieter operating valve than either the metal or carbon poppet designs and further provides a dampening effect for positive closing against the valve seat, i.e., less throttling due to rebound as is present, for example, in a silicone ball.

The segmented polyether polyurethane material, which is advantageously employed for the cover, is known to have wear resistant properties nine times greater than silicone rubber. This advantage can extend the life of the heart valve against wear failure when used in contact with metal or cloth-covered metal valve surfaces. The present poppet can provide antithrombogenicity by utilizing such materials as the segmented polyether polyurethane, including heparinized versions. The segmented polyether polyurethane outer jacket has been found to be resistant to absorption of blood lipids as evaluated in laboratory animals. No deterioration is evident after periods up to 2 years when implanted either subcutaneously or in the blood stream for as long as eight months. The core material of the poppet further acts to limit alteration through absorption. With absorption eliminated or greatly reduced, ball failure due to deterioration can be overcome. An additional advantage is the fact that the poppet of the present invention can be steam sterilized by autoclaving.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A composite heart valve poppet for use in ball-in-cage type artificial heart valves, comprising: a ball-shaped core of a rigid material, said core having applied thereto a layer of physiologically inert elastomeric material, said layer having a thickness of from 0.5 to 3.0 mm, said core material being polypropylene having a specific gravity of 0.9, and said elastomeric material being segmented polyether polyurethane having a specific gravity of 1.1.

* * * * *